United States Patent
Hsieh Huang (10) Patent No.: US 6,287,141 B1
(45) Date of Patent: Sep. 11, 2001

(54) APPARATUS FOR WINDING AND STORING COMMUNICATION WIRE

(76) Inventor: Pi Yun Hsieh Huang, No. 73, Alley 16, Lane 159, Sec. 4, Mucha Rd., Taipei (TW)

(*) Notice: Subject to any disclaimer, the term of this patent is extended or adjusted under 35 U.S.C. 154(b) by 0 days.

(21) Appl. No.: 09/619,439

(22) Filed: Jul. 19, 2000

(51) Int. Cl.$^7$ .................................................. H01R 13/72
(52) U.S. Cl. ............................................. 439/501; 439/4
(58) Field of Search ............................... 439/501, 4, 502, 439/164, 162; 242/371, 385.1, 917

(56) References Cited

U.S. PATENT DOCUMENTS

| | | | |
|---|---|---|---|
| 4,946,010 | * | 8/1990 | DiBono ......................... 191/12.2 R |
| 5,422,957 | * | 6/1995 | Cummins ............................ 381/183 |
| 5,701,981 | * | 12/1997 | Marshall et al. .................... 191/12.4 |
| 6,056,591 | * | 5/2000 | Liao ..................................... 439/501 |

* cited by examiner

Primary Examiner—Brian Sircus
Assistant Examiner—Son V. Nguyen
(74) Attorney, Agent, or Firm—Rosenberg, Klein & Lee (57) ABSTRACT

An uninterrupted communication rotary shaft device comprises a housing, a rotary shaft set, a rotary disk, two communication wires, and a spiral spring. The rotary shaft set is engaged with the rotary disk and is formed by insulating disks of an odd number and conductive disks of even numbers. Each conductive disk is connected to a communication wire. A connecting seat with a receptacle is disposed at the place that the first ring adjacent to the pivotal connecting hole. A plurality of conductive elements are arranged in the connecting seat. One end of each conductive element is in contact with respective conductive disk, while another end is connected to each conductive wire of another communication wire. Two communication wire may retain uninterruptedly ad the rotary disk rotates. Besides, the edge of the rotary disk has a ratchet. The lateral side thereof has a braking button being actuated by an elastic elements so that as the rotary disk rotates, it can be buckled by the breaking button, and thus a length of the communication wire can be retained outsides in order to avoid the wire to be over tightened or in disorder.

9 Claims, 9 Drawing Sheets

APPARATUS FOR WINDING AND STORING COMMUNICATION WIRE

FIELD OF THE INVENTION

The present invention relates to an uninterrupted communication rotary shaft device, which serves to be connected to a computer, a communication device or a consumer electric device. The communication ire can be pulled out or rewound to avoid to be in disorder. A special uninterrupted device is used to retain the signals in stable to be interrupted despite the communication wire is pulled or rewound.

BACKGROUND OF THE INVENTION

Communication sires are necessary devices in various computer, communication or consumer's electronic devices, such as computer, modem, telephone or fax machines, for connecting two such devices. However, if the communication wire is too long, a disorder condition will occur or if it is too short, an inconvenience occurs. Thus, there are many various communication rotary shaft devices are designed. Basically, in general, the communication rotary shaft device includes a housing, a rotary disk, a sensors and one or two communication wires. The rotary disk is pivotally installed on the rotary disk of the housing. Two lateral sides thereof are formed with respective rings for winding the spiral spring and a pulled communication wire so that as the communication wire is pulled, the rotary disk can be driven simultaneously so as to pull the spiral spring to provide an elastic force to the communication wire for rewinding. In order that during the process of rotating the rotary disk, another communication wire can be electrically contacted, some communication rotary shaft devices are installed with various uninterrupted devices. For example, a plurality of concentric conductive rings with different diameters are installed, which are matched with a plurality of conductive elastic pieces or steel balls on another rotary disk or housing with respect to each conductive ring. Thus, as the rotary disk rotates, the conductive elastic pieces or steel balls or other conductive elements have tracks with respect to the rotary disk are exactly the same as the position of each conductive ring so as to retain in an electric contact continuously. However, the uninterrupted devices formed by these conductive elastic pieces or steel balls or other conductive elements have many elements. The volume has a minor element and thus makes some trouble in assembly. Furthermore, vibrations and corrosion occur so that some faults induce and thus the communication rotary shaft device only has a short lifetime. Moreover, when a communication wire is pulled, the pulling force of the spiral sprint is applied so that the communication wire can not retain a predetermined length at outer sides and thus, the user will feel inconvenient in use.

SUMMARY OF THE INVENTION

Accordingly, the primary object of the present invention is to provide an uninterrupted communication rotary shaft device so that two communication wires are retained in a steady electric connection.

In order to achieve the aforesaid improve, the present invention provides an un interrupted communication rotary shaft device comprises a housing, a rotary shaft set, a rotary disk, two communication wires, and a spiral spring. The rotary shaft set is engaged with the rotary disk and is formed by insulating disks of an odd number and conductive disks of even numbers. Each conductive disk is connected to a communication wire. A connecting seat with a receptacle is disposed at the place that the first ring adjacent to the pivotal connecting hole. A plurality of conductive elements are arranged in the connecting seat. One end of each conductive element is in contact with respective conductive disk, while another end is connected to each conductive wire of another communication wire. Two communication wire may retain uninterruptedly as the rotary disk rotates. Therefore, the aforesaid object of the present invention is achieved.

The various objects and advantages of the present invention will be more readily understood from the following detailed description when reading in conjunction with the appended drawing.

DETAILED DESCRIPTION OF THE PREFERRED EMBODIMENTS

Figure 1:
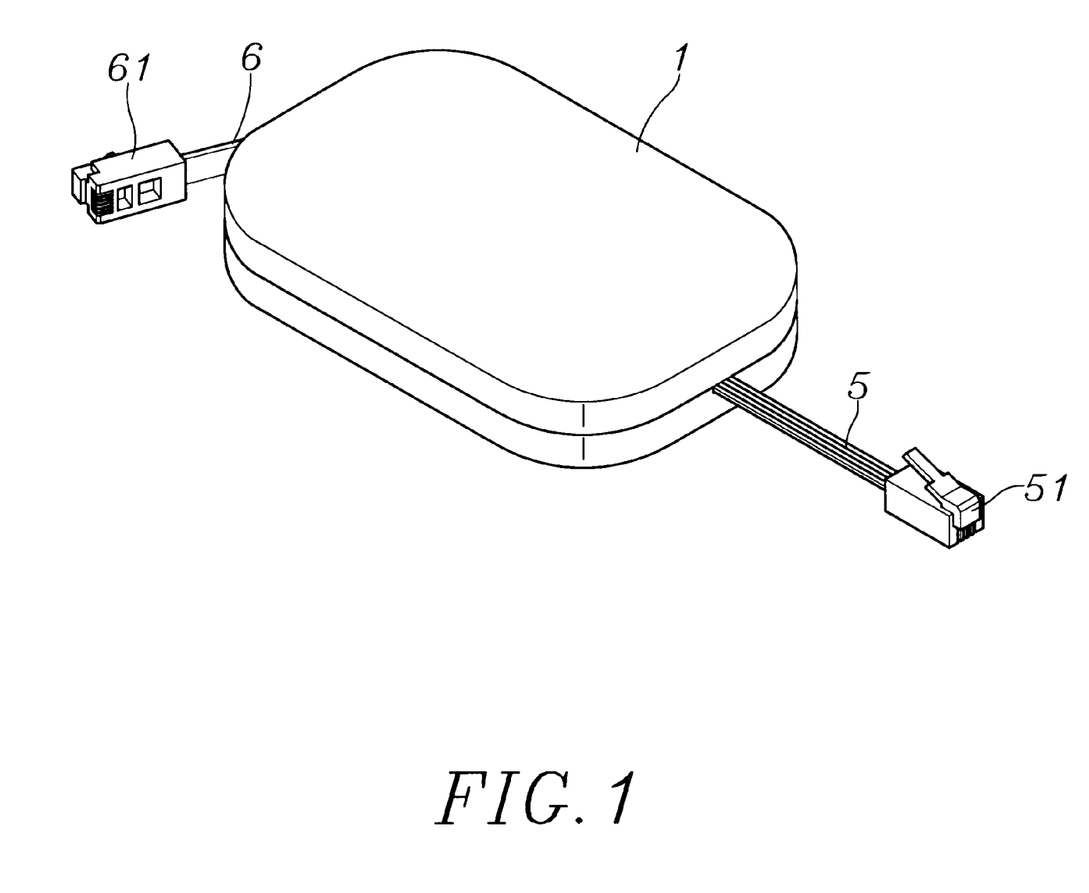
FIG. 1 is a perspective view of the present invention.
Figure 2:
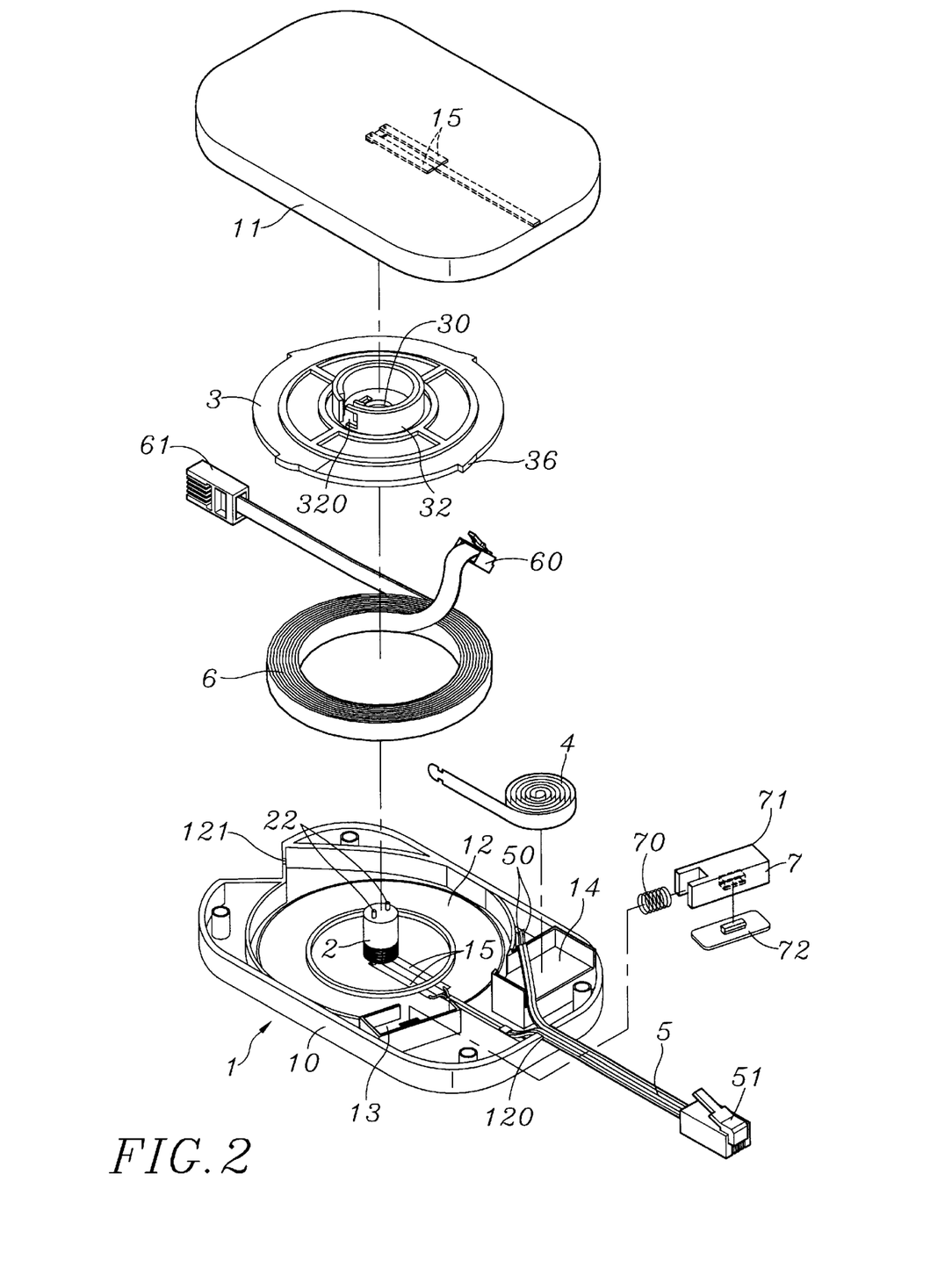
FIG. 2 is an exploded perspective view of the present invention.

With reference to FIGS. 1 and 2, the uninterrupted communication rotary shaft device of the present invention is illustrated. The uninterrupted communication rotary shaft device mainly includes a housing 1 a rotary shaft set 2, a rotary disk 3, a spiral spring 4, a first communication wire 5, and a second communication wire 6.

The housing 1 is formed by two half halves 10 and 11. The adjacent receiving groove 12, receiving groove 13, and spring groove 14 are installed in the housing, and also a first hole 120 and a second hole 121 are installed therein. A plurality of spaced conductive plates 15 are installed in the half halves 10 and 11, which extends to the center of the receiving groove 12.

Figure 3:
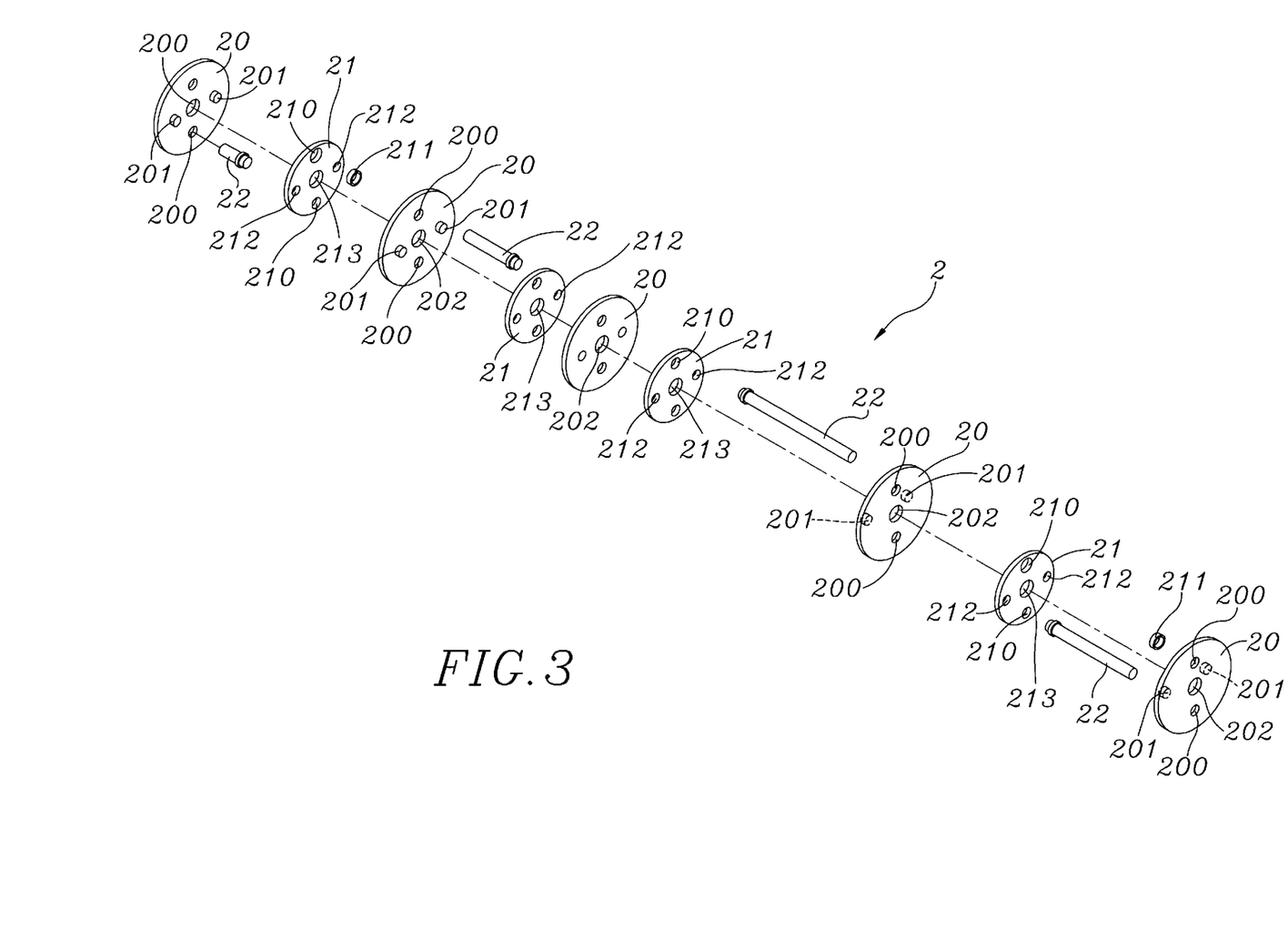
FIG. 3 is an exploded perspective view of the rotary shaft set in the present invention.

The rotary shaft set 2 is installed in the center of the receiving groove 12, as shown in FIG. 3. The rotary shaft set 2 includes insulating disks of odd number and conductive disks of even number which are arranged adjacent and alternatively. The insulating disks 20 at outer side are formed with respective through holes 200 and 210 with respect to the conductive disks 21 so that the conductive rods 22 installed on the conductive disks 20 may pass through these through holes 200 and 210 to slightly protrude therefrom. In order to avoid that the inner conductive disks and outer conductive disks are shortened due to the penetration of the conductive rods 22. Another insulating ring 211 is arranged in the through hole 210 on each outer conductive disk 21. The adjacent insulating disk 20 and conductive disk 21 are installed with a positioning post 201 and a positioning hole 212, respectively, which are coupled with one another.

Figure 4:
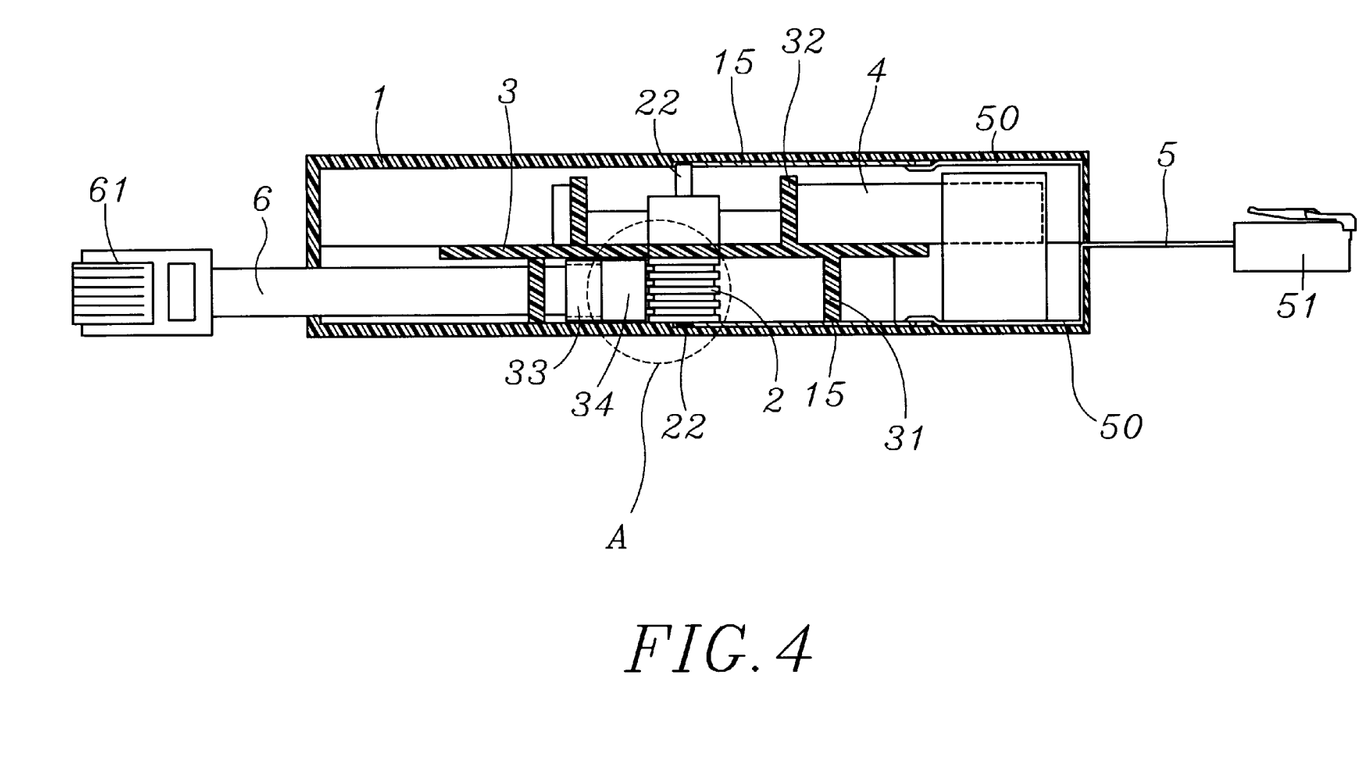
FIG. 4 is a schematic cross sectional view of the present invention.
Figure 5:
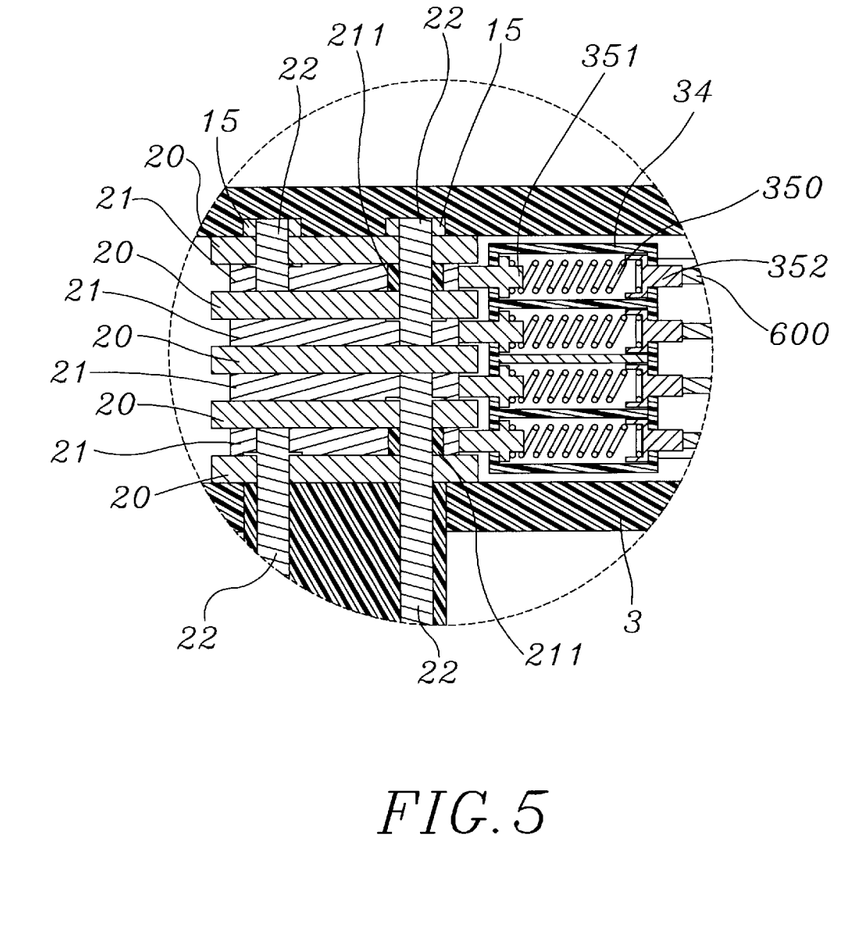
FIG. 5 is a structural schematic view showing the relation of the rotary shaft set and the connecting seat in the present invention.

The insulating disk 20 and the conductive disk 21 may be assembled rapidly by this buckling structure and the penetration of the conductive rod 22. All the centers of the insulating disks 20 and conductive disks 21 are formed with axial holes 202 and 213. Therefore, as all the insulating disks 20 and conductive disks 21 are assembled by the conductive rods 22, plastics can be filled therein to be formed as an integral body, as shown in FIGS. 4 and 5. While as the rotary shaft set 2 is arranged in the center of the rotary disk 12, the conductive rod 22 with two slight protruded ends is in contact with the respective conductive plate 15, as shown in FIGS. 4 and 5.

Figure 6:
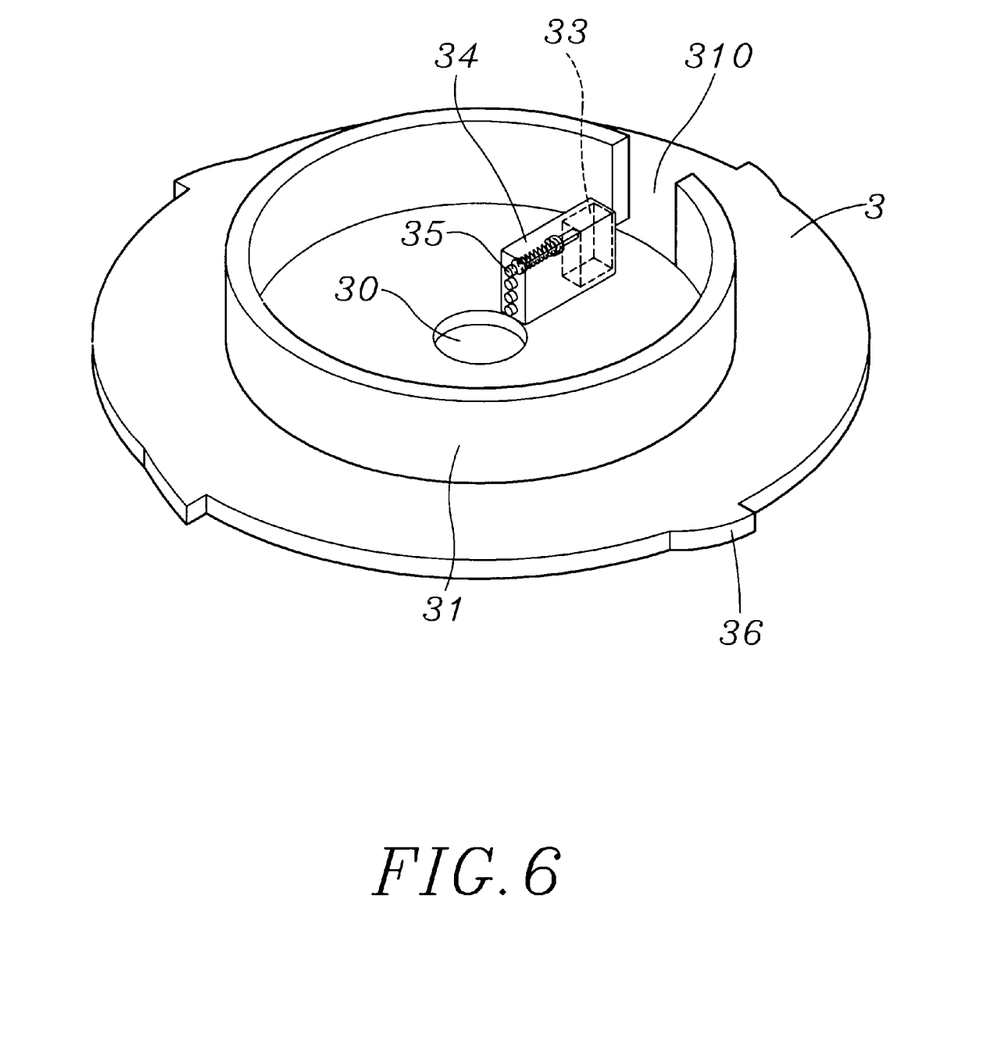
FIG. 6 is a structural perspective view of the connecting seat in the present invention.

The rotary disk 3 is pivotally installed in on the rotary shaft set 2 by the pivotal connecting hole 30 so as to be rotatable on the receiving groove 12. Two disk surfaces are formed with a first ring 31 having a through hole 310 (as shown in FIG. 6) and a second ring 32 having a trench 320. A connecting seat 34 with a receptacle 33 is disposed at the place that the first ring 31 adjacent to the pivotal connecting hole 30. A plurality of conductive elements 35 the number of which is equal to that of the conductive disks 21 are arranged in the connecting seat 34, as shown in FIG. 5. In facts each conductive element 35 includes two pins 351, 352 at the two ends of the spring 350. One of the pins 351 is retained to be in contact with the conductive disk 21.

The spiral spring 4 is received in the spring groove 14. One end of thereof is hooked to the trench 320 of the second ring 32 so as to be wound around the second ring as the rotary disk 3 rotates. Thus, a restoring elastic force is provided by the rotary disk 3.

The first communication wire 5 has one end penetrating through the first hole 120 of the housing 1 to cause the conductive wires 50 of even numbers are divided by halves and then each half of the wires extends along the housing halves 10 and 11 to the respective conductive plates 5 to be welded therein, while another end is installed with a first plug 51.

The second communication wire 6 has an end installed in the third plug 60 passing through the through hole 310 on the first ring 31 of rotary disk 3 so as to be inserted to the receptacle 33. Thus, each of the conductive wires 600 of even number is electrically contacted with another pin 532, while the remained conductive wires are wound around the first ring 31. Another end thereof passes out of the first through hole 121. Further, a third plug 61 is installed.

Thereby, in one hand, each conductive wire 50 of the first communication wire 5, by the respective conductive plate 15 and conductive rods 22, is indirectly electrically connected to each respective conductive disk 21. In the other hand, each conductive wire 600 of the second communication wire 6 is indirectly contacted with each respective conductive disk 21 by each conductive element 35 in the connecting seat 34. Consequently, an armature of a special form is formed so that the first communication wire 5 and the second communication wire 6 are electrically connected by the special rotary shaft set 2. Therefore, when the user pull the second communication wire 6 so as to drive the rotary disk 3 to rotate, the pin 351 in the connecting seat 34 still resists against the edge of the conductive disk 21 so as to assure that the first and second communication wire 3, 5 can be supplied with power uninterruptedly.

Figure 8:
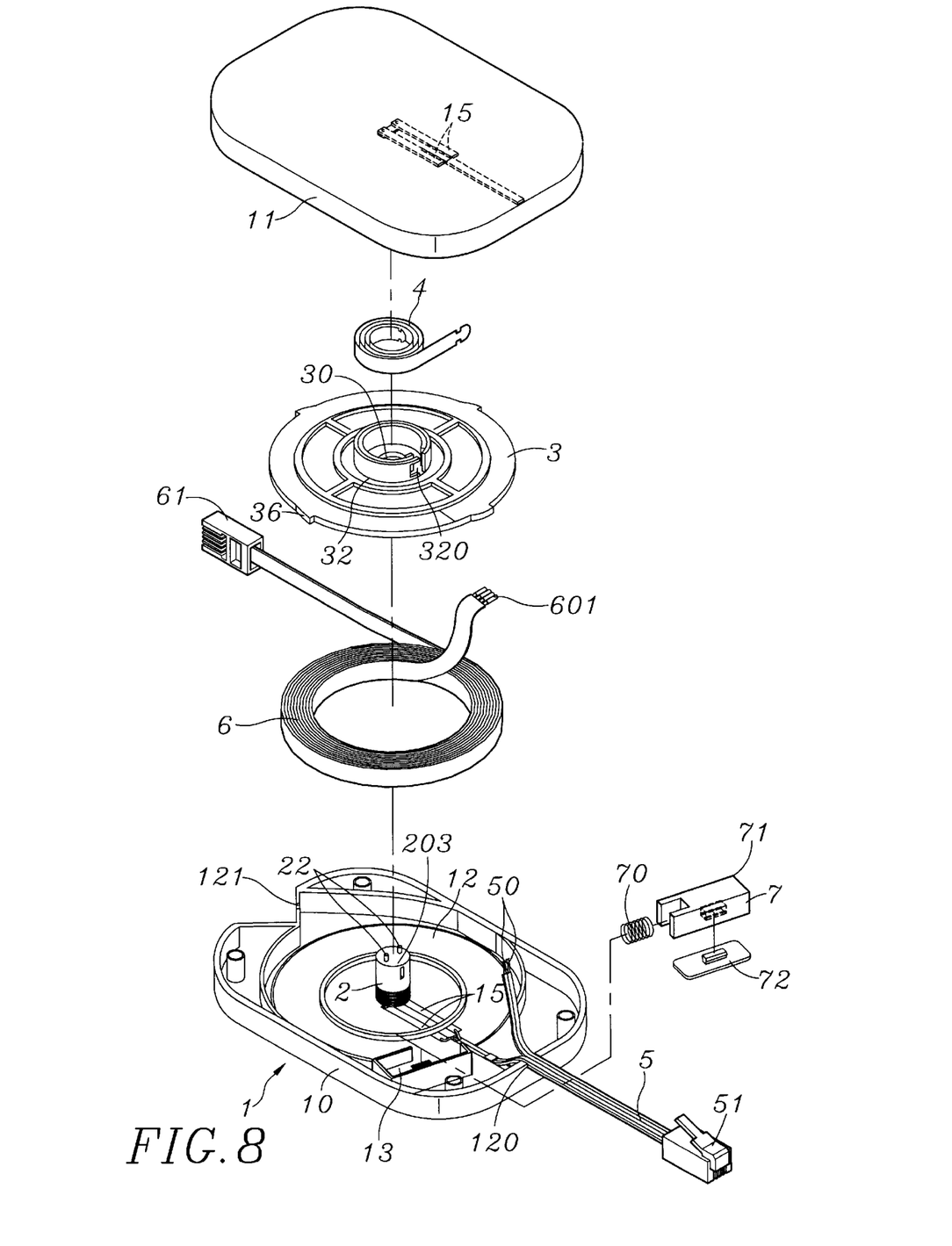
FIG. 8 is an exploded perspective view of another embodiment of the present invention.
Figure 9:
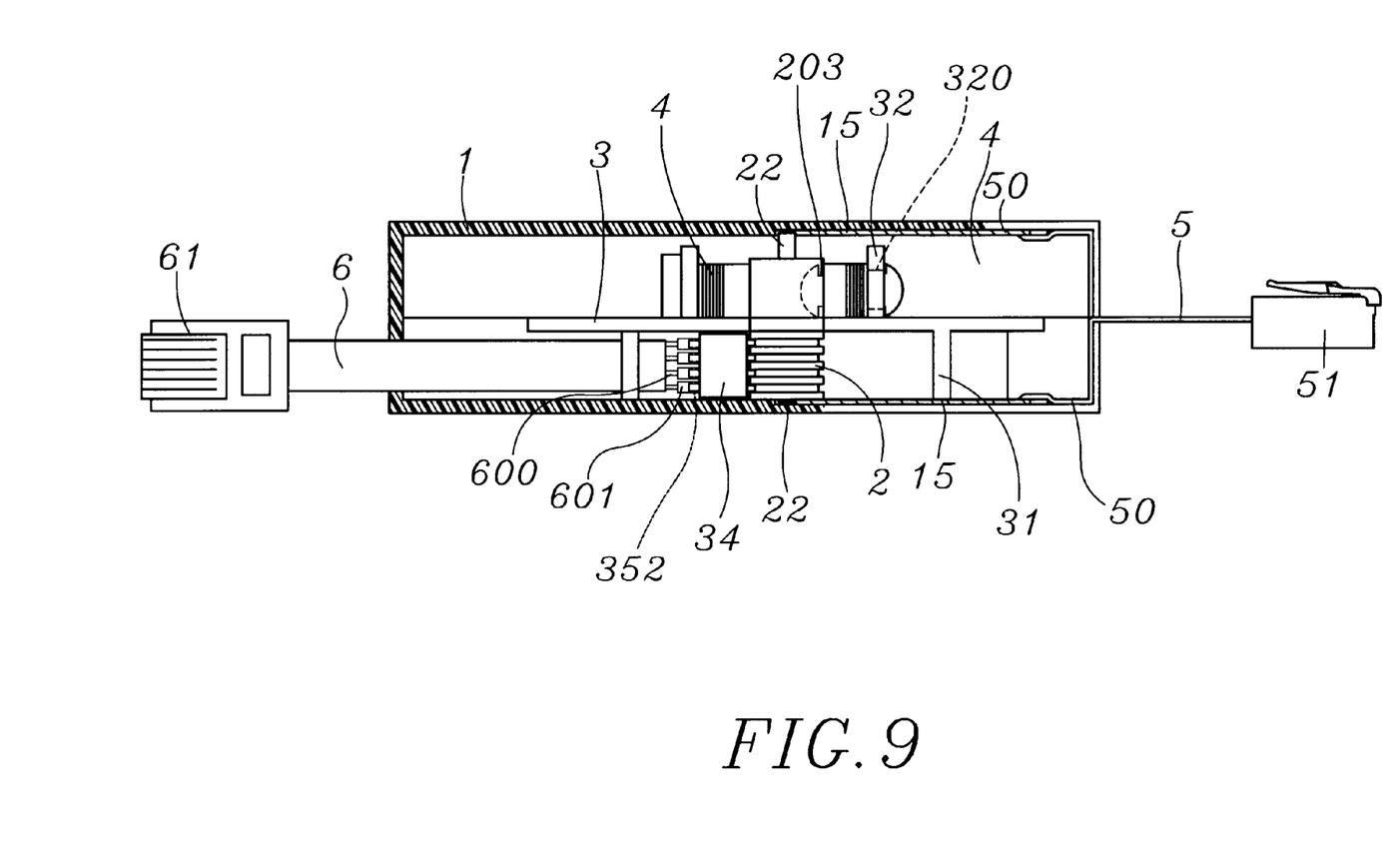
FIG. 9 is a schematic cross sectional view of the present invention.

Besides, another embodiment of the present invention is illustrated in FIGS. 8 and 9. In this embodiment the aforesaid spiral spring 4 is received in the second ring 32, and the outer end thereof is hooked to the trench 321 and the inner end is hooked to the trench 203 preinstalled in the rotary shaft set 2. Thus, the volume of the whole housing is further reduced again. While one end of the third plug 60 originally in the second communication wire 6 can be changed so as to the bare end of each conductive wire 600 has a conductive tube 601 so that head of the wire can be inserted into the respective pin 352 by the tube 601. Therefore, the conductive combination is complete.

Figure 7:
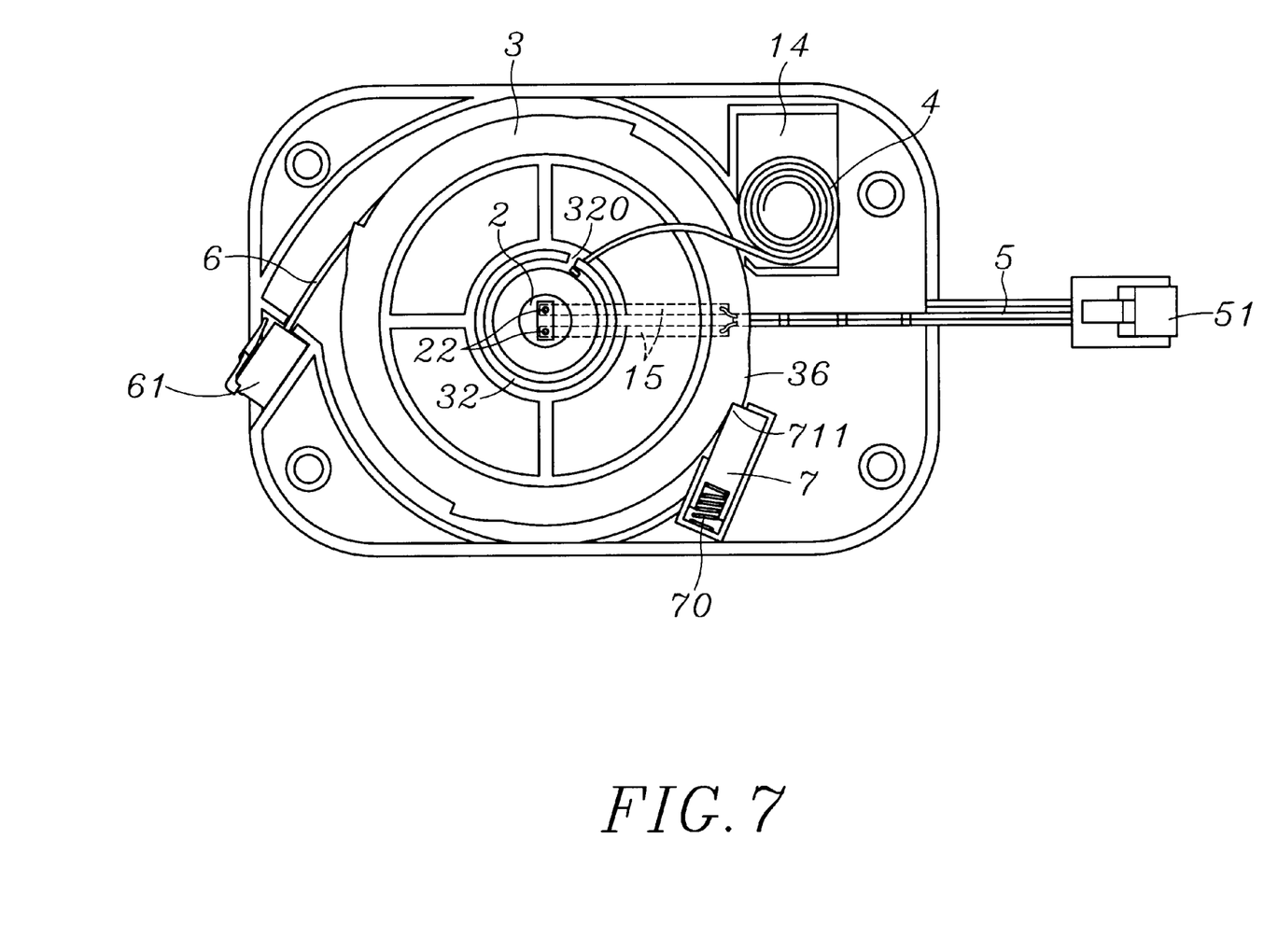
FIG. 7 is an elevation view showing that one housing half has been removed in the present invention.

Besides, in order that after the second communication wire 6 is pulled out through a predetermined length, the length can be fixed. The edge of the rotary disk 3 can be shaped with at least one tilt ratchet 36, and the receiving groove 13 adjacent to the rotary disk 3 is received with a braking button which can be actuated by the elastic element 70 to move forwards toward to the rotary disk 3. The braking button 7 has a buckle 71 which can be buckled in the ratchet 36 and a movable portion 72 protruding from the housing 1 for moving. Therefore, as the user pulls the second communication wire 6 to a predetermined length and then releases so that the rotary disk 3 rotates back automatically. The ratchet 36 will be buckled by the buckled portion 71, as shown in FIGS. 7. However, the user is only necessary to move the movable portion, the buckle 71 will separate from the ratchet 36 so that the rotary disk 3 will rotate backwards and then the second communication wire 6 is rewound completely.

Although the present invention has been described with reference to the preferred embodiments, it will be understood that the invention is not limited to the details described thereof. Various substitions and modifications have been suggested in the foregoing description, and others will occur to those of ordinary skill in the art. Therefore, all such substitutions and modifications are intended to be embraced within the scope of the invention as defined in the appended claims.

What is claimed is:

1. An uninterrupted communication rotary shaft device comprising:

a housing formed by two housing halves installed with a rotary disk groove and having a first hole and a second hole communicating with the rotary disk groove;

a rotary shaft set installed at a center of the rotary disk groove; the rotary shaft set including insulating disks of odd number and conductive disks of even number which are alternatively arranged one by one; each conductive disk being installed with a conductive rod axially extended outwards to be protruded from a surface of the rotary shaft set;

a rotary disk pivotally connected to the rotary shaft set by a center pivotal connecting hole thereof so as to be rotatable in the rotary disk groove; the rotary disk having two disk surfaces each of which being formed with a first ring having a through hole and a second ring having a trench; a connecting seat being formed at a place that the first ring is adjacent to the pivotal connecting hole; the connecting seat including conductive elements with a number equaling that of the conductive disks being installed; one end of each conductive element being retained in contact with an edge of a respective conductive disk;

a spiral spring having one end hooked to the trench of the second ring for providing a restoring elastic force to the rotary disk;

a first communication wire having an end passing through the first hole of the housing, the first communication wire including a plurality of first conductive wires divided into two halves, the first conductive wire halves extending along the respective housing halves and electrically coupled to respective ones of the conductive rods, another end of the first communication wire being installed with a first plug; and, a second communication wire having an end passing through the through hole of the first ring of rotary disk so as to be inserted into a receptacle formed in said connecting seat; the second communication wire including a plurality of second conductive wires each thereby electrically contacted with a pin coupled to a connecting seat conductive element; an intermediate portion of the second communication wire being wound around the first ring, another end of the second communication wire passing out of the second hole.

2. The uninterrupted communication rotary shaft device as claimed in claim 1, wherein at the place that each insulating disk with respect to the conductive disk is formed with a through hole, and an insulating ring is formed at the through hole of each conductive disk, thereby, the conductive rod formed at an inner side of the conductive disk passes through the through hole to be protruded out slightly.

3. The uninterrupted communication rotary shaft device as claimed in claim 1, wherein at least one of an adjacent pair of the insulating and conductive disks is formed with a positioning post and the other of the adjacent pair of the insulating and conductive disks is formed with a positioning hole, the positioning post and hole engaging one another.

4. The uninterrupted communication rotary shaft device as claimed in claim 1, wherein the insulating disks and conductive disks are each formed with an axial hole; whereby, as all the insulating disks and conductive disks are assembled by the conductive rods, plastics can be filled therein to be formed as an integral body by molding.

5. The uninterrupted communication rotary shaft device as claimed in claim 1, wherein a plurality of spaced conductive plates are installed in the housing halves, each conductive plate to the center of the rotary disk groove, each conductive plate having one end in contact with a protruding end of one of the conductive rods and another end connected to one of the first conductive wires of the first communication wire.

6. The uninterrupted communication rotary shaft device as claimed in claim 1, wherein each conductive element in the connecting seat of the rotary disk includes a spring and two pins at the two ends of the spring; one of the pins is retained to be in contact with the conductive disk; while another pin is in contact with the respect conductive wire of the second communication wire.

7. The uninterrupted communication rotary shaft device as claimed in claim 1, wherein the second communication wire has an end installed with a third plug to be inserted in the connecting seat receptacle, each second conductive wire being in contact with one of the connecting seat conductive elements.

8. The uninterrupted communication rotary shaft device as claimed in claim 1, wherein an edge of the rotary disk is shaped with at least one tilt ratchet, and the receiving groove adjacent to the rotary disk is received with a braking button which is actuated by an elastic element to move forwards to the rotary disk; the braking button having a buckle which can be buckled in the ratchet and a movable portion protruding from the housing for moving.

9. The uninterrupted communication rotary shaft device as claimed in claim 1, wherein one end of the second communication wire to be assembled to the connecting seat has clamped thereto a conductive tube for a conductive element.

* * * * *